(12) United States Patent
Woollett et al.

(10) Patent No.: US 9,140,547 B2
(45) Date of Patent: Sep. 22, 2015

(54) SIGNAL TRANSMISSION SYSTEM FOR A MEASUREMENT DEVICE

(75) Inventors: Martin Woollett, Bristol (GB); John Styles, Bristol (GB); John Liptrot, Gloucester (GB)

(73) Assignee: RENISHAW PLC, Wotton-Under-Edge (GB)

( * ) Notice: Subject to any disclaimer, the term of this patent is extended or adjusted under 35 U.S.C. 154(b) by 0 days.

(21) Appl. No.: 12/923,218

(22) Filed: Sep. 9, 2010

(65) Prior Publication Data

US 2011/0002361 A1 Jan. 6, 2011

Related U.S. Application Data

(63) Continuation of application No. 10/539,344, filed as application No. PCT/GB03/05516 on Dec. 18, 2003, now Pat. No. 7,821,420.

(30) Foreign Application Priority Data

Dec. 23, 2002 (GB) .................................... 0229763.8

(51) Int. Cl.
*G01B 21/04* (2006.01)
*H04B 1/713* (2011.01)

(52) U.S. Cl.
CPC .......... *G01B 21/047* (2013.01); *G01B 2210/58* (2013.01); *H04B 1/713* (2013.01)

(58) Field of Classification Search
CPC ...... G01B 21/047; G08B 25/10; G08B 13/08; G08B 1/08; G08B 13/00; G06K 19/0723
USPC .................. 455/41.1–41.3, 522, 13.4, 127.5; 340/539.3, 693.3, 7.32, 7.36, 340/10.1–10.34, 425.2
See application file for complete search history.

(56) References Cited

U.S. PATENT DOCUMENTS 4,119,871 A  10/1978  Zibert
4,153,998 A   5/1979  McMurtry
(Continued)

FOREIGN PATENT DOCUMENTS

EP  0 506 318 A1   9/1992
EP  1 049 270 A2  11/2000
(Continued)

OTHER PUBLICATIONS

Baatz et al., "Adaptive Scatternet Support for Bluetooth using Sniff Mode," Local Computer Networks, 26th Annual IEEE Conference, dated Nov. 14, 2001, pp. 112-120.
(Continued)

*Primary Examiner* — Mehmood B Khan
(74) *Attorney, Agent, or Firm* — Oliff PLC

(57) ABSTRACT

A transmission system for a measurement device on a coordinate positioning apparatus comprises a station mounted on the measuring device and another station mounted on the coordinate positioning apparatus, wherein the station and the another station communicate with each other using a spread spectrum radio link, for example, frequency hopping. The station on the probe sends a regular signal and on receiving the signal the another station on the coordinate positioning apparatus synchronizes its clock and sends an acknowledgement signal. Measurement data is either sent in the regular signal or in a measurement event driven signal.

21 Claims, 6 Drawing Sheets

(56) References Cited

U.S. PATENT DOCUMENTS

| | | | |
|---|---|---|---|
| 4,435,905 A | | 3/1984 | Bryan |
| 4,477,809 A | * | 10/1984 | Bose .................... 340/10.41 |
| 5,279,042 A | | 1/1994 | Gonzalez et al. |
| 5,432,754 A | * | 7/1995 | Brady et al. .................... 367/134 |
| 5,543,778 A | * | 8/1996 | Stouffer .................... 340/539.14 |
| 5,570,364 A | * | 10/1996 | Bar-David .................... 370/407 |
| 5,684,472 A | * | 11/1997 | Bane .................... 340/870.02 |
| 5,696,903 A | * | 12/1997 | Mahany .................... 709/228 |
| 5,949,352 A | * | 9/1999 | Ferrari .................... 340/870.16 |
| 6,272,547 B1 | * | 8/2001 | McWilliams .................... 709/232 |
| 6,314,300 B1 | * | 11/2001 | Nakashima et al. .................... 455/517 |
| 6,366,622 B1 | * | 4/2002 | Brown et al. .................... 375/322 |
| 6,405,136 B1 | | 6/2002 | Li et al. |
| 6,463,307 B1 | * | 10/2002 | Larsson et al. .................... 455/574 |
| 6,512,463 B1 | * | 1/2003 | Campbell et al. .................... 340/870.02 |
| 6,600,428 B1 | * | 7/2003 | O'Toole et al. .................... 340/10.34 |
| 6,657,552 B2 | | 12/2003 | Belski et al. |
| 6,901,066 B1 | * | 5/2005 | Helgeson .................... 370/348 |
| 7,015,789 B1 | * | 3/2006 | Helgeson .................... 340/3.1 |
| 7,079,043 B2 | * | 7/2006 | O'Toole et al. .................... 340/6.1 |
| 7,196,621 B2 | * | 3/2007 | Kochis .................... 340/539.13 |
| 7,243,249 B1 | * | 7/2007 | Dunstan et al. .................... 713/310 |
| 7,821,420 B2 | | 10/2010 | Woollett et al. |
| 2002/0071478 A1 | | 6/2002 | Cornwall et al. |
| 2002/0175805 A9 | | 11/2002 | Armstrong et al. |
| 2003/0086095 A1 | | 5/2003 | Ruck |
| 2003/0112126 A1 | * | 6/2003 | Kubler et al. .................... 340/10.33 |
| 2003/0185170 A1 | * | 10/2003 | Allen et al. .................... 370/329 |
| 2005/0118981 A1 | * | 6/2005 | Laroia et al. .................... 455/343.3 |
| 2006/0152335 A1 | * | 7/2006 | Helgeson .................... 340/3.1 |

FOREIGN PATENT DOCUMENTS

| | | |
|---|---|---|
| EP | 1 112 810 A1 | 7/2001 |
| EP | 2 214 147 A1 | 8/2010 |
| EP | 2 216 761 A1 | 8/2010 |
| JP | A-11-094509 | 4/1999 |
| JP | A-11-177564 | 7/1999 |
| JP | A-11-505048 | 11/1999 |
| JP | A-2001-202582 | 7/2001 |
| JP | A-2001-264040 | 9/2001 |
| JP | A-2003-516095 | 5/2003 |
| WO | WO 01/33714 A1 | 5/2001 |
| WO | WO 01/41348 A2 | 6/2001 |
| WO | WO 01/84076 A1 | 11/2001 |

OTHER PUBLICATIONS

EP Office Action for Application No. 10 004 263.9, dated Jun. 29, 2010.

EP Office Action for Application No. 10 004 269.6, dated Jun. 29, 2010.

Japanese Official Notice of Rejection with English Translation mailed Aug. 4, 2009.

May 24, 2004 International Search Report issued in Application No. PCT/GB03/05516.

Jan. 8, 2010 Office Action issued in JP Application No. 2004-561635 (with English translation).

Aug. 29, 2007 Office Action issued in EP Application No. 03782636.9.

Nov. 25, 2009 Office Action issued in EP Application No. 03782636.9.

Aug. 3, 2012 Office Action issued in JP Application No. 2010-108355 (with English translation).

Jun. 30, 2011 Office Action issued in CN Application No. 200910008593.5 (with English translation).

May 19, 2014 Examination Report issued in Indian Application No. 1870/DELNP/2008.

* cited by examiner

SIGNAL TRANSMISSION SYSTEM FOR A MEASUREMENT DEVICE

This is a Continuation of application Ser. No. 10/539,344, filed Jun. 16, 2005 (now U.S. Pat. No. 7,821,420), which in turn is a National Phase of PCT/GB03/005516, filed Dec. 18, 2003. The disclosure of each of the prior applications is hereby incorporated by reference herein in its entirety.

BACKGROUND

This invention relates to measurement device for use on coordinate measuring apparatus, such as a coordinate measuring machines (CMMs) machine tools, manual coordinate measuring arms and inspection robots. More particularly, it relates to signal transmission systems for such measurement devices.

A trigger probe for determining the position of a workpiece is described in U.S. Pat. No. 4,153,998. In use, the probe is moved by the machine relative to a workpiece. The probe has a deflectable stylus and delivers a trigger signal when the stylus contacts the workpiece. The trigger signal is indicated by the probe switching from one state to another. The trigger signal is used by the machine controller to freeze the outputs of scales or other measuring means which indicate the position of the probe. The position of the point of contact on the workpiece surface can thus be determined.

Especially on machine tools, it can be difficult to wire the probe directly to the machine controller, and so various wireless signal transmission systems have been developed in the prior art. These include inductive systems (where the signal is transmitted by electromagnetic induction between two coils), optical systems (where an optical emitter such as an infra-red diode is provided on the probe and produces an optical signal which is received by an appropriate receiver) and radio systems (having a radio transmitter in the probe and a radio receiver fixed at a convenient location on the machine). An example of a radio system is shown in U.S. Pat. No. 4,119,871. An important requirement of such probes is repeatability, i.e. that the same result should be achieved every time a given measurement is repeated. The mechanical position of the stylus in the probes described in U.S. Pat. No. 4,153,998 is extremely repeatable in space, an instant of production of the trigger signal always has a definite, repeatable relationship with the instant of contact between the stylus and the workpiece. This means that accurate results can be obtained from the probe by a simple calibration procedure.

However, the accuracy would be destroyed if the signal transmission system were not repeatable, that is, if there were an unknown, variable delay in the signal transmission. If this occurs then the probe would travel an unknown variable distance after the instant of generation of the trigger signal before the machine control is able to freeze the outputs of the measuring means. There is then an error between the position of contact and the position indicated by the frozen outputs and this error is an unknown variable quantity which cannot be removed by calibration. Thus, in order to maintain overall accuracy of the probe system there is the problem of ensuring that any transmissions delays introduced by the signal transmission system are repeatable i.e. the same delay should be introduced every time the probe is triggered. The probe calibration procedure mentioned above will then also remove this repeatable delay caused by the transmission system.

U.S. Pat. No. 5,279,042 discloses an analogue radio signal transmission system for a probe in which the probe is provided with a transmitter for producing a carrier signal onto which a probe signal may be modulated. A receiver receives the probe data and produces a probe output signal derived from the transmitter data. A clock on the transmitter provides a time standard for the whole system, the receiver uses an oscillator with a phase comparator at its input to ensure that the oscillator is permanently synchronised with a clock in the transmitter. When a probe signal occurs, the time elapsed between the start of a counter cycle and the change of state of the probe is latched in a shift register and transmitted serially.

SUMMARY

This method has the disadvantage that as the transmitter transmits a continuous signal which is required to synchronise the transmitter and receiver the system uses a significant proportion of the probe battery power and thus reduces the battery life.

Furthermore, in a fixed frequency system, the number of available communication channels is equal to the limited number of frequency channels. There is therefore the problem of receivers from other systems which use this frequency channel intercepting the transmission sent from the probe. In addition, the presence of radio traffic may affect the transmissions.

The present invention provides a transmission system for a measurement device for a coordinate positioning apparatus, comprising:

a first station for mounting with one of the measuring device and the coordinate positioning apparatus;

a second station for mounting with the other of the measuring device and the coordinate positioning apparatus;

Wherein the first and second stations communicate using a spread spectrum radio link.

The spread spectrum radio link has the advantage of reducing the chance of unwanted receivers intercepting a transmission, and increasing the chance of a transmission getting through to the correct receiver in the presence of unwanted radio traffic.

The first and second stations communicate with one another using a spread spectrum radio link. This is a technique which takes a narrow band signal and spreads it over a broader portion of the radio frequency band. Two types of spread spectrum radio link comprise frequency hopping and direct sequencing. In frequency hopping the signal is spread by hopping the narrow band signal as a function of time. In direct sequence, the signal is spread by mixing it with a special code.

The use of a periodic signal rather than a continuous signal increases battery life.

The measurement device may comprise a measurement probe, for example a touch trigger probe.

Preferably the transmission system uses a world-wide frequency band.

The first and second stations may be provided with a clock, wherein the clocks are synchronised at least once. The first station may transmit a regular transmission and wherein when the second station receives the signal it may synchronise its clock with the first station. If a signal transmitted by the first station is not adequately received by the second station, the signal may be retransmitted by the first station.

If the second station receives the signal transmitted by the first station, it may transmit an acknowledgement signal. If the first station does not receive an acknowledgement signal in response to its signal, it will re-transmit said signal. The ability to re-transmit messages which have not been received enables the system to be capable of operating in a noisy environment.

Preferably the transmission system comprises a half duplex link.

In the event of a measurement event, the first station may transmit information relating to said measurement event. The measurement event may comprise a touch trigger event. The information may include data relating to the time of the measurement event. The first station may transmit a regular transmission and information relating to the measurement event may be transmitted in an additional transmission.

The signal transmitted by the first station contains information relating to the measurement device, the measurement device output signal in the second station may be produced after a time delay. This time delay is chosen so that it is long enough to allow retransmissions of the signal within the time delay.

A master clock is provided at one end of the transmission system and a sliding correlator is provided to recover the master clock. This provides a reference for the measurement device) output signal time delay (e.g. a probe trigger output time delay). If the second station receives a signal from the first station it transmits an acknowledgement signal, the acknowledgement signal sent to the first station is synchronised with the master clock. This removes the need for clock recovery at the first station.

In a preferred embodiment, signals sent between the first and second stations comprise data bits and data bits relating to more important information are provided with greater error protection than other data bits. The data bits relating to more important information may be provided with a higher hamming distance than other data bits.

Preferably, the first station transmits regular signals and wherein the first station has a mode and wherein each regular signal asks if the first station should change mode, and wherein if the first station receives an affirmative response, it changes mode. A mode may comprise a power saving mode in which the regular signals are sent at a slower rate than the normal mode. This minimises power consumption and is sufficient to allow the second station to maintain synchronisation with the first station.

Preferably, if the first and second stations are not synchronised, the first and second stations will hop between frequency channels at different rates until second station receives the signal and synchronises with the first station. If the second station detects background noise above a predetermined level on the selected frequency channel, it will change to a different frequency channel.

A second aspect of the invention provides a transmission system for a measurement probe for a coordinate positioning apparatus, comprising:

a first station for mounting with one of the measuring device and the coordinate positioning apparatus;

a second station for mounting with the other of the measuring device and the coordinate positioning apparatus;

wherein the first and second stations may communicate on different frequency channels and wherein if the second station hears significant noise on a certain frequency channel, it will hop to another frequency channel.

BRIEF DESCRIPTION OF THE DRAWINGS

Preferred embodiments of the present invention will now be described by way of example with reference to the accompanying drawings wherein.

DETAILED DESCRIPTION OF EMBODIMENTS

Figure 1:
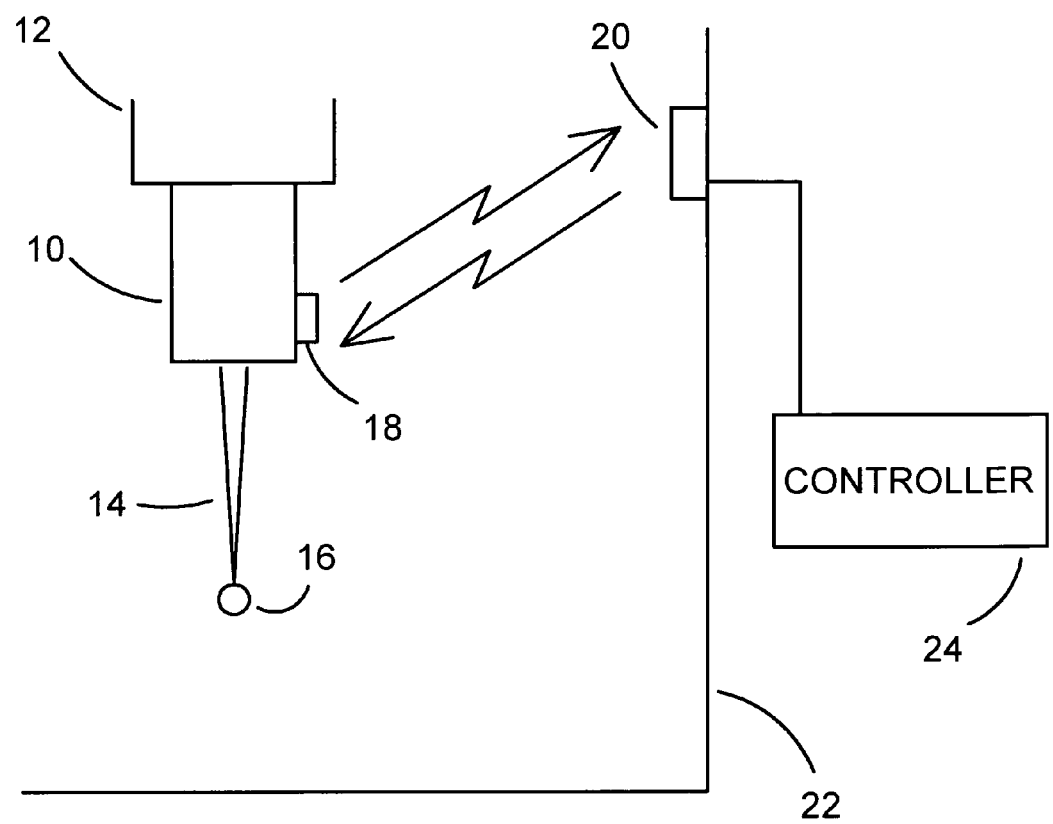
FIG. 1 illustrates a touch trigger probe mounted on a machine tool.

FIG. 1 illustrates a touch trigger probe 10 mounted on a spindle 12 of a machine tool. The touch trigger probe 10 has a deflectable stylus 14 with a workpiece-contacting tip 16. The signal transmission system comprises two stations, the probe station 18 is connected to the touch trigger probe and is mounted to a moving part of the machine tool. A machine station 20 is mounted on a stationary part 22 of the machine tool structure and is connected to the machine tool controller 24.

Data is transmitted between the probe station 18 and machine station 20 using a spread spectrum radio link, in this case a frequency-hopping radio communications link, which sends discrete packages of serial binary data.

Both the probe and machine stations hop between different frequency channels roughly in synchronisation with each other with occasional messages sent between them to synchronise the two stations. The probe station initiates each exchange of messages and receives a reply from the machine station.

The frequency-hopping and synchronisation will now be described in more detail with reference to FIG. 2. The machine station is listening for messages most of the time whilst the probe station is in its half-on condition most of the time (e.g. as in slots n+1 to n+3 above). When the probe station is half-on its probe interface and microprocessor will be on and the radio modem will be off. The probe interface and microprocessor each use about 2 mW of power whilst the radio modem uses significantly more power, about 120 mW when switched on. The radio modem consumes a similar amount of power whether it is receiving or transmitting. The half-on state thus minimises power consumption of the battery powered probe system.

Figure 2:
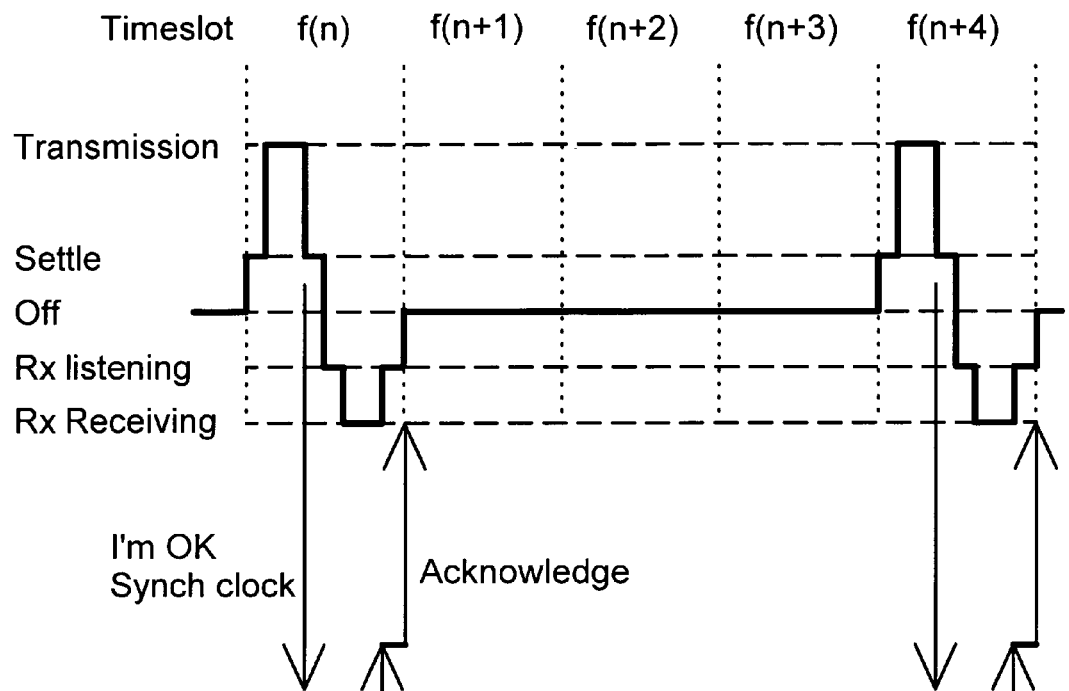
FIG. 2 is a schematic illustration of the frequency hopping and synchronisation of the first and second stations.
Figure 2:
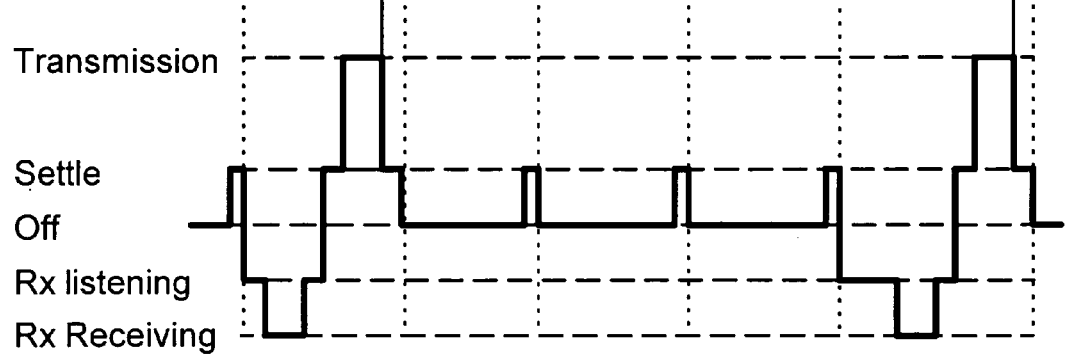

FIG. 2 shows the probe station turning on with a small settling time and then transmitting an "I'm OK" message on frequency channel f(n). The probe station then listens for the acknowledgement from the machine station. The machine station which is listening on channel f(n) receives this message, synchronises its clock with the probe station and then sends an acknowledgement back on channel f(n). Upon receiving this acknowledgement the probe station switches back to its half-on condition. The probe station clock therefore acts as the master clock for the system. When the machine and probe stations are synchronised, they hop between frequency channels at the same time.

The probe station is now silent for a number of time slots (assuming there are no probe triggers) and the machine station listens on successive frequency channels f(n+1), f(n+2) etc. Although the probe station is not transmitting on the successive frequency channels f(n+1), f(n+2) etc, it is still hopping between frequency channels. FIG. 2 shows an exaggerated error in clocks between the probe and machine stations. This error is small enough to allow the stations to remain synchronised to the order of 100 silent time slots. Thus although because of this error the machine and probe stations hop to a new channel at a slightly different time, the error is small enough that there is sufficient overlap when the probe station is transmitting and the machine station is listening in the same frequency channel for signals to pass between the stations. This error is corrected each time the machine station receives a message from the probe station.

For clarity FIG. 2 only shows three silent slots and thus three frequency-hops are unused. The periodic timer then prompts the probe station to transmit again on f(n+4) and this cycle then repeats until interrupted by some other event (e.g. a lost transmission, a probe trigger or a probe station turn-off signal).

Figure 3:
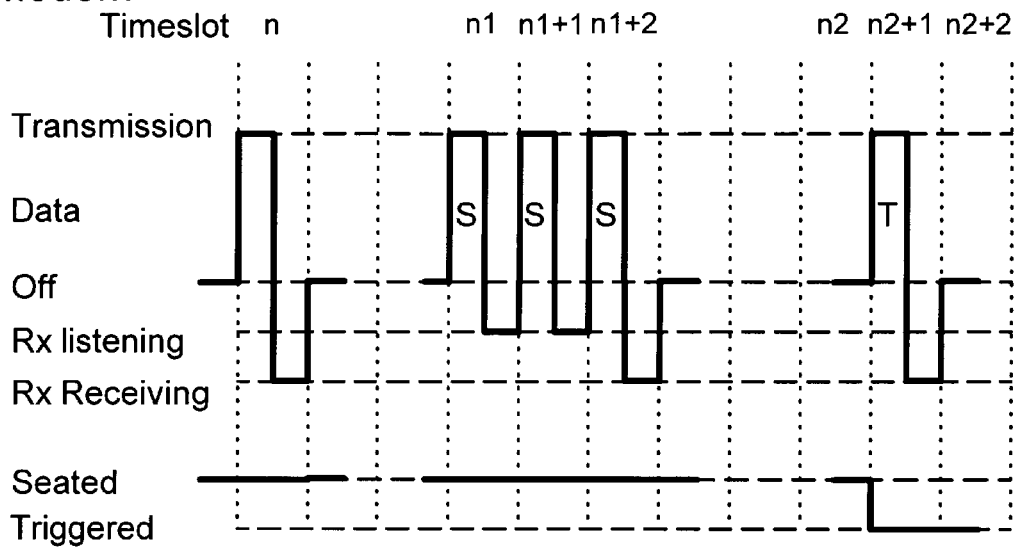
FIG. 3 is a schematic illustration showing lost hops and event interruptions.
Figure 3:
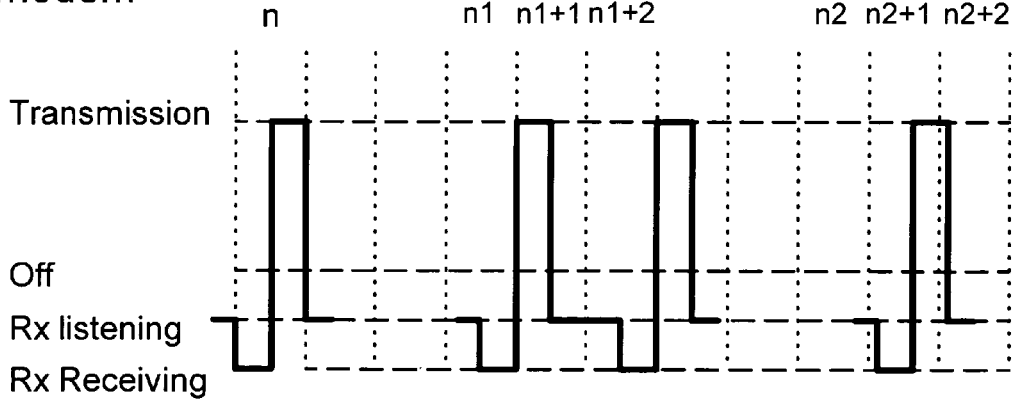

Transmissions from the probe station may not be received by the machine station due to for example interference. Such a situation will now be described with reference to FIG. 3. In FIG. 3 settling time is not shown and the effects of synchronisation of clocks and hopping between the probe station and machine station is assumed.

The transmitted radio packet from the probe station includes probe data. For example, the probe may be seated (S) or the probe may have triggered (T). Other information may also be transmitted in the radio packet, for example the condition of the battery, how many transmissions have been attempted for this message and data relating to the time of a touch trigger event.

In time slot n a successful message from the probe station and reply from the machine station, all on frequency channel f(n) is shown. This confirms that both the probe station and radio link are operating and that the output from the machine station can be trusted.

In time slot n1 the probe station transmits a message, the machine station receives this message and sends an acknowledgement. However the probe station does not receive this reply for example due to interference.

As no acknowledgement is received the probe station will re-transmit the message in the next time slot n1+1. FIG. 3 shows the re-transmission of the message from the probe station in time slot n1+1. However, as the machine station receives nothing, it does not send an acknowledgement. The probe station will therefore receive no message and so will re-transmit the message in slot n1+2.

In time slot n1+2 everything works. The machine station receives the probe station message and the probe station receives the machine station acknowledgement. The probe station can therefore return to its half-on condition with its radio modem off.

If however after a predetermined time the machine station does not receive the message from the probe station then either the radio link or the probe station has failed and the machine station will set an error output.

For the first transmission of a message, a normal radio frequency power level is used, for example 1 mW. On subsequent re-transmissions, the radio frequency power level may be increased, thus increasing the chance that the message will get through.

As there is the opportunity of re-transmission at a higher radio frequency power, this enables a slightly lower radio frequency power to be used for normal transmissions. This has the advantage of minimising radio traffic and extending battery life.

In time slot n2 in FIG. 3, a probe trigger occurs. An out of sequence transmission must be sent by the probe station to the machine station as soon as possible. The probe station transmits a probe trigger message to the machine station in the next time slot n2+1. As before, the machine station acknowledges the message. A probe trigger message outranks the periodic update and thus when a probe trigger occurs data relating to the probe trigger will be included in the data packet sent in the next transmission.

Figure 4:
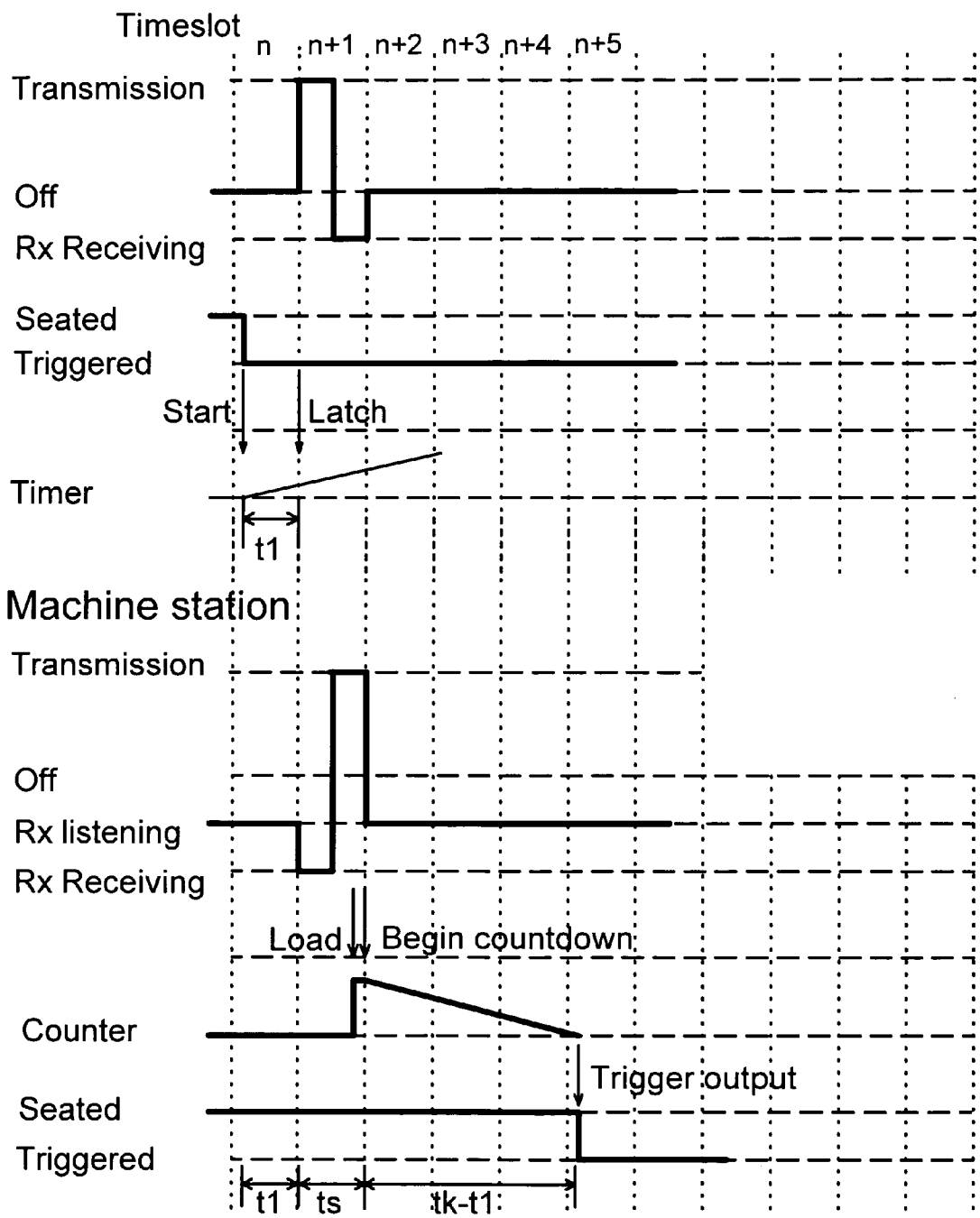
FIG. 4 is a schematic illustration showing a probe trigger and delay counters.

As illustrated in FIG. 4, when a probe trigger occurs a timer in the probe begins counting from zero. The value of this timer t1 is latched at the beginning of the next time slot n+1. This value t1 is transmitted from the probe station to the machine station in a transmission in the next time slot n+1.

The machine station decodes this value t1 from the transmitted message and computes a value tk−t1 where tk is a constant. The machine station loads its own countdown counter with the value tk−t1. At the end of the time slot n+1 the countdown counter is started and when it reaches zero the probe status output changes to triggered.

The time delay between the probe trigger and the machine station probe output will therefore be t1+ts+tk−t1=ts+tk, where ts is the time of one time slot. This value ts+tk is constant. The delay between probe trigger and machine station probe output is therefore always the same.

The time constant tk is selected to allow re-transmission of the message if the first transmission (i.e. in time slot n+1) fails. In FIG. 4, time slots n+2, n+3 and n+4 are available for re-transmission of the probe trigger message. For a re-transmission a correction is applied to tk−t1 equal to the time taken by the number of unsuccessful transmissions. This correction will be the number of retries done multiplied by the length of a single time slot. The message transmitted by the probe station will include data which indicates which try it is (1st, 2nd, 3rd, etc). Alternatively the probe station can (re-)latch the probe station counter at the beginning of each time slot in which a message will be sent. (This value will be t1+ts for a message sent in slot n+2, t1+2*ts for a message sent in slot n+3 and so on.) Thus whichever time slot the message is successfully transmitted in, the total time delay will be constant (=ts+tk) between the probe trigger and the machine station probe status output.

For the probe station and machine station to communicate they must both be set to the same frequency channel at the same time. To achieve this the probe station frequency channel controller and the machine station frequency channel controller must be synchronised. This is achieved by a synchronisation recovery/find and collect process described below with reference to FIG. 5.

The probe station is shown hopping between frequency channels at normal speed (e.g. one hop per millisecond) and the machine station is shown hopping at a much slower speed (e.g. one hop per 50 milliseconds). The probe station transmits in every time slot (n, n+1, n+2 etc) and then listens for a reply before hopping to the next time slot. The probe station transmission contains the ID number of the probe and includes a request for synchronisation and acknowledgement of the message. The machine station listens for many probe station time slots and occasionally changes to a different frequency channel. In time slots n, n+1 and n+2 in FIG. 5 the probe station is shown transmitting on successive different frequency channels whilst the machine station listens. However whilst the machine station is on a different frequency channel to the probe station it receives nothing.

In time slot n1−4 the machine station is shown hopping to a new frequency. Meanwhile the probe station continues hopping frequency channels and transmitting. In slot n1 the probe station and the machine station are on the same frequency channel and the machine station hears the message from the probe station and synchronises its time slot clock to the probe station. The machine station is now synchronised with the probe station and a periodic handshake to maintain synchronisation can now occur. The machine station acknowledges the message from the probe station in the time slot n1.

Figure 5:
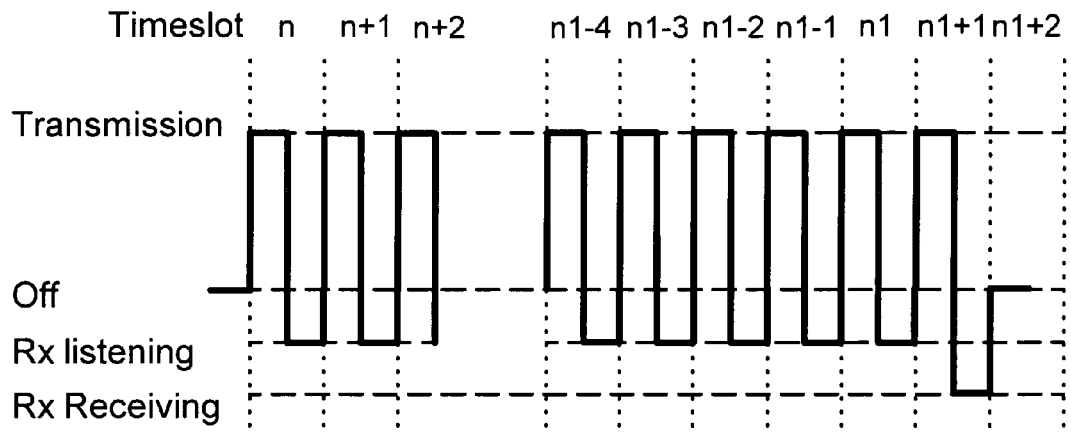
FIG. 5 is a schematic illustration showing synchronisation recovery.
Figure 5:
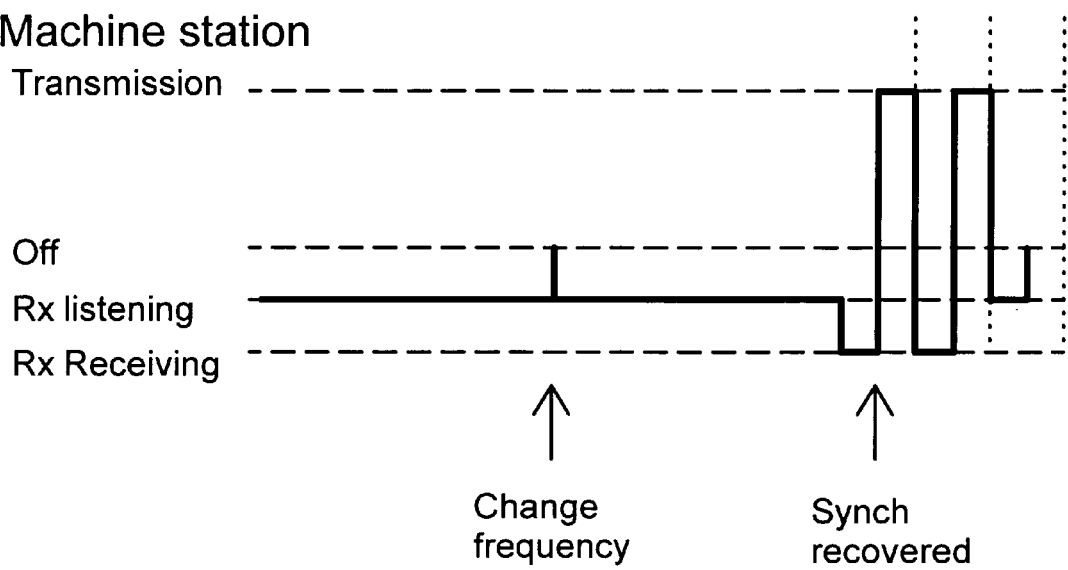

Usually the acknowledge message from the machine station will be received by the probe station. However FIG. 5 illustrates what happens if the probe station fails to hear the acknowledgement. In time slot n1 the machine station transmits an acknowledgement but although the probe station is listening it does not receive the acknowledgement. The probe station hops to the next time slot n1+1 and again transmits its message. As the machine station is synchronised it will be listening on the correct frequency channel in time slot n1+1 and will thus hear the message from the probe station. The machine station will synchronise its clock again and will acknowledge the message again. The probe station message in slot n1+1 is effectively a re-transmission as shown in FIG. 3.

During the process of synchronisation recovery, if the machine station hears significant noise on a certain frequency channel, it will immediately hop to another frequency channel rather than wait on the frequency channel where background noise may swamp any transmission from the probe station.

It is desirable to be able to turn on the probe station via a radio message from the machine station. Whilst waiting for this radio turn-on the probe station is in its radio standby mode in which it consumes substantially less battery power than when it is in its operating mode.

The probe station radio standby mode is similar to the periodic update, although the time slots may be wider and the cycle time longer, i.e. slow hopping between frequency channels.

Most of the time the data exchange will consist of the probe station transmitting its ID number and asking it if should be turned on, whilst the machine station replies that it is not needed. As with the operating mode the machine station is synchronised to the probe station during this exchange. If the probe station does not receive an acknowledgement from the machine station it will re-try to transmit the message in subsequent time slots in different frequency channels.

If it is required to turn-on the probe station, the machine station will reply "turn-on" and change to operating mode. The probe station will then switch to the operating mode. In the operating mode the machine station will maintain synchronisation with the probe station as described above.

Turn-off will require an exchange of messages as the turn-off request may come from the machine station or alternatively from the probe station (for example a time out). Following turn-off both probe and machine stations will return the synchronised slow hopping described above.

As discussed earlier, the radio signals between the probe and machine stations consist of message packets of serial binary data. Each message contains a header which includes probe station identity data, or address, needed to enable the machine station receiver to recognise whether the message is intended for that receiver and to synchronise a clock in the machine station to the probe station clock.

The machine station uses a correlator to recognise the incoming message header.

Figure 6:
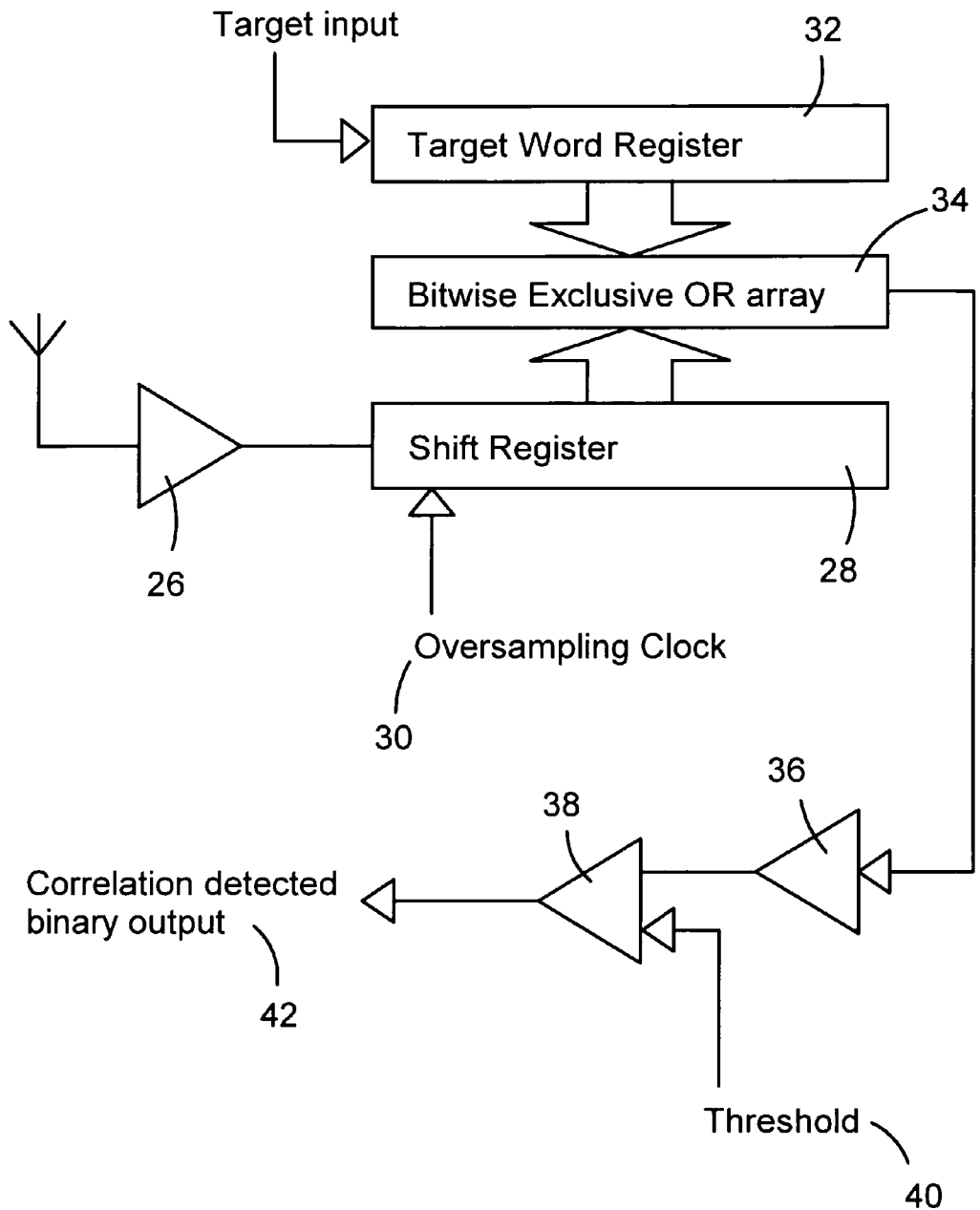
FIG. 6 is a schematic illustration of the sliding correlator in the machine station.

FIG. 6 illustrates the sliding correlator used in the machine station. A radio frequency receiver and de-modulator 26 receive radio signals transmitted from the probe station and output a serial stream of received data into a large shift register 28.

On each pulse of an oversampling clock 30, the incoming serial data stream is sampled and its value (1 or 0) is loaded into the shift register 28. Simultaneously the contents of the register are shifted right 1 bit, the last bit being shifted 'off the end' and lost.

A target word is held in a separate target register 32. The entire shift register contents are continuously, in parallel, bit to bit compared with the target register contents by an array of exclusive-or (EOR) gates 34. One EOR gate is used per bit of the shift register and the outputs of the EOR gates are added at an Adder 36 to determine the number of bit-matches detected.

The number of bit matches detected is then fed to a comparator 38, where it is compared with the required number of matches threshold 46, which is typically greater than 95%, to determine the correlation detected binary output 42.

The target word is programmable, thus the correlator can be set to detect different desired bit sequences. In particular, the target word is set to the expected header sequence which will be sent from the transmitter (i.e. the acquired partner probe station).

In a typical system the header could be a 32 bit word with a data rate of 1 bit/microsecond. The oversampling clock might run at 10 times the data rate, i.e. 10 MHz and the threshold could be 95% match. Thus the shift register would contain 10×32=320 flip flops, and the EOR gate array would contain 320 EOR gates. The outputs of the 320 EOR gates would be fed to the adder, which would output a number between 0 and 320 to the comparator. To achieve a 95% or better match, the threshold would be set at 320×0.95=304 bits. Thus if 304 or more bits in the shift register matched their targets from the target word, the correlation detected output will be True, otherwise it will be False. This test is done and the correlation detected output updated on every pulse of the oversampling clock, i.e. every 100 nanoseconds.

The advantage of this system is that clock recovery is only required at one end of the half duplex link. The master clock is provided at the probe station. At the machine station, the sliding correlator is used to recover the clock data from the messages transmitted from the probe station. The sliding correlator provides a reference for the probe trigger time delay and allows acknowledgement messages to be sent already synchronised, thus removing the need for clock recovery at the master end of the link (i.e. at the probe station).

There are two main types of possible correlator errors. The correlator may fail to identify a transmitted message, described above or a correlator may report a match when no message has been transmitted.

If the machine station falsely believes that it has received a message from the probe station, this will result in loss of the synchronisation of the machine station clock, failure of the radio link and an error message being produced. The probe station only listens for a machine station acknowledgement immediately after it has sent a message and the machine station acknowledgement is thus expected within a very narrow timeslot.

When in the operating mode, a failure will occur when noise imitates a machine station acknowledgement and thus prevents the probe station from re-transmitting the message. However the probe station is only vulnerable to this error when it is waiting for an acknowledgement which doesn't come.

The transmitted message contains several different items of information, such as probe station address, probe status (i.e. seated or triggered), timestamp (i.e. time of probe trigger) and battery status. Some of these items have high importance, such as the probe station address and the probe status. The timestamp has high importance if the probe status is 'triggered' but is otherwise not important. The battery status has low importance.

In order to optimise error protection of the transmission, the most important data bits of the message are encoded with a large hamming distance. This allows small numbers of bit errors to be corrected and larger numbers of bit errors to be rejected. A higher hamming distance has the advantage of allowing some error correction but has the disadvantage that it increases transmission time. Less important data is provided with a lower degree of error protection, for example multiple bit error detection using a cyclic redundancy check.

For example, the probe station address and probe status data may be encoded with a hamming distance of 6, which could allow 1 bit error correction and 4 bit error detection. The timestamp and battery status may be encoded with a lower hamming distance of 4 which could provide 3 bit error detection.

The information required during the periodic transmissions (probe station address and probe status) thus has higher error protection than other information in the message. There are several empty timeslots between each periodic transmission which are available for re-transmissions if the transmission fails. However, if all these timeslots are used up by unsuccessful re-transmissions, an error signal will be produced and the whole system will stop. It is therefore advantageous to have a high reliability periodic transmission, leaving the empty timeslots as a safety buffer.

In the event that the probe status is 'triggered', the timestamp data becomes important. This data has a lower hamming distance and will be retransmitted if an error is detected. There may be, for example, about 50 periodic transmissions per second and about 1 trigger per second. It is therefore more important to avoid re-transmissions on the periodic transmission than the trigger signal.

The system of using longer hamming distance codes for the more important data has the advantage that it reduces the number of retransmissions required for the periodic transmissions. As the lower priority data is given lower hamming distance codes, the transmission time is reduced. The radio traffic and battery life are thus also reduced.

A feature of the present invention is that once the probe station is in place, it will only communicate with its partnered machine station. This enables different systems to operate simultaneously in the same environment without interfering with one another. A partnering process transfers the probe stations unique 32 bit ID to the machine station. In a preferred embodiment of this process, when a probe is put onto a machine, the probe stations enters a 'Send Acquisition' mode. In this mode it transmits a message which includes its unique ID and a 'header' which is recognised by the machine stations. This message is transmitted periodically, for example once every 1 ms across all channels in its hopping pattern. In a next step, the machine station is powered on and in an initial time period, for example 10 seconds, it is receptive to the 'Send Acquisition' signal sent by the probe station. When the machine station receives the transmission in which it recognises the 'header', it reads the ID. The machine station saves the ID into its memory in the form of an EEPROM (electrically erasable programmable read only memory) and sends an acknowledgement back to the probe station which contains the same ID. If the probe station successfully receives an acknowledgement (without errors) containing its own ID, it stops the 'Send Acquisition' process. The probe and machine station are now successfully partnered and the machine station will only communicate with the probe station having this ID.

When the probe and machine stations are partnered (i.e. have the same ID), they will have the same channel hopping pattern and thus will be able to communicate whilst channel hopping.

The probe and machine stations of the transmission systems may transmit signals using worldwide license free radio frequency bands. Examples of such bands are 2.4 GHz and 5.6 GHz. An advantage of this is that probe and machine stations may be set to function within these frequency bands during manufacture and then the same version of the probe may be used anywhere in the world.

In the above embodiment, the probe station sends out a regular transmission to the machine station. However an alternative would be for the machine station to send out a regular transmission requesting information and in response the probe station recording information (i.e. measurement and time information) and transmitting it to the machine station.

The above embodiment describes a regular transmission in which the probe and machine stations synchronise and an out of sequence event driven transmission which contains data about the touch trigger event. However, it is possible to include data relating to the touch trigger event in the regular sequence of transmissions and thus eliminate the requirement for out of sequence event driven transmissions. In this case, the data will need to contain information about the time of the touch trigger event.

This invention is not limited to touch trigger probes. This transmission system is also suitable for use with scanning probes. In this case the regular transmissions will include data relating to probe deflection and the time of that probe deflection.

Likewise, the transmission system is suitable for other measurement devices for use on coordinate positioning apparatus such as machine tools and coordinate measuring machines. A ball bar device is used for performing a calibration operation on machine tools and coordinate measuring machines and is described in U.S. Pat. No. 4,435,905. The device comprises an elongate telescopic bar provided with a ball at each end. In use, each of the balls is retained in a socket provided on the machine spindle and table respectively and the arm is then driven in a circular path about the centre of the ball retained in the socket on the table. A single axis transducer provided on the bar measures any variation in the centre-to-centre spacing of the balls, and thus determines the extent to which the tool holder path varies from a circular path. Data from the single axis transducer is relayed to the machine control via a cable but this has the disadvantage that it limits the number of rotations possible with the ballbar. By using the transmission system of the present invention, the transducer output and corresponding data may be transmitted in the radio signal, thus removing the need of the cable and allowing the ballbar to make several continuous rotations. This transmission system may be used on other measurement devices, such as temperature probes.

Although the above embodiment describes use of frequency hopping, other types of spread spectrum radio link are suitable for use in the invention, for example direct sequence.

What is claimed is:

1. A measurement apparatus comprising:
a measurement probe comprising a first station, and
a coordinate positioning apparatus comprising a second station,
wherein the first station and the second station communicate with one another using a spread spectrum radio link,
the first station is operable in a normal mode for transmitting information relating to measurement events and in a power saving mode in which the first station periodically transmits a request signal to the second station for asking the second station if the first station should change to the normal mode,
when the first station is operating in the power saving mode, and when the second station requires the first station to operate in the normal mode so that the first station can transmit information to the second station relating to measurement events, the second station responds to the request signal received from the first station by transmitting an instructing signal to the first station that instructs the first station to enter the normal mode, the first station continues to operate in the power saving mode, transmitting the request signal periodically, until it receives the instructing signal from the second station, in response to which the first station changes mode from the power saving mode to the normal mode, the first station periodically transmits a regular signal when operating in the normal mode, transmission of the request signals in the power saving mode and transmission of the regular signals in the normal mode allow the second station to maintain synchronisation with the first station, and a rate of transmission of the request signals in the power saving mode is slower than a rate of transmission of the regular signals in the normal mode.

2. The apparatus according to claim 1, wherein the spread spectrum radio link is a frequency hopping spread spectrum link in which the first station hops between different frequency channels, and a frequency hopping rate in the power saving mode is slower than a frequency hopping rate in the normal mode.

3. The apparatus according to claim 1, wherein the first station communicates with the second station via a direct sequence spread spectrum radio link.

4. The apparatus according to claim 1, wherein the instructing signal transmitted by the second station that instructs the first station to enter the normal mode comprises an affirmative signal, and the second station can alternatively transmit a negative signal in response to the request signal that instructs the first station to remain in the power saving mode.

5. The apparatus according to claim 1, wherein
the first station, when operating in the normal mode, transmits information relating to measurement events occurring at the measurement probe,
the second station receives the information relating to each measurement event and generates a corresponding output signal, and
a time delay between each measurement event that occurs at the measurement probe and the corresponding output signal generated at the second station is substantially constant.

6. The apparatus according to claim 5, wherein the measurement probe comprises a touch trigger probe and the information relating to measurement events comprises trigger signals.

7. The apparatus according to claim 1, wherein the first station comprises a master clock and the second station recovers the master clock from signals transmitted by the first station.

8. The apparatus according to claim 1, wherein the measurement probe comprises a battery, and the measurement probe is powered by the battery.

9. The apparatus according to claim 1, wherein the first station has an identity code and the second station is set to only communicate with the first station having the identity code.

10. A transmission system for a measurement device for a coordinate positioning apparatus, the transmission system comprising:
a first station for mounting with one of the measurement device and the coordinate positioning apparatus; and
a second station for mounting with the other of the measurement device and the coordinate positioning apparatus;

wherein the first station and the second station communicate with one another using a spread spectrum radio link, the first station can be placed in a normal mode or in a power saving mode that consumes less power than the normal mode, the first station transmits a plurality of request signals at intervals throughout a duration of the power saving mode, each request signal asking if the first station should change to the normal mode, the first station changes mode to the normal mode in response to receipt at the first station of an affirmative response to one of the request signals from the second station, the spread spectrum radio link is a frequency hopping spread spectrum link, the first station hops between frequency channels, and frequency hopping occurs at a slower rate when in the power saving mode while in rough synchronisation than when in the normal mode.

11. The transmission system according to claim 10, wherein the spread spectrum radio link is a direct sequence spread spectrum link.

12. The transmission system according to claim 10, wherein if a signal transmitted by the first station is not adequately received by the second station, the signal is retransmitted by the first station.

13. The transmission system according to claim 10, wherein, when the second station receives a signal transmitted by the first station, the second station transmits an acknowledgement signal, and
the first station comprises a radio modem that is turned off when the first station receives the acknowledgement signal from the second station.

14. The transmission system according to claim 10, wherein
the first station is mounted with the measurement device,
when a signal transmitted by the first station in the normal mode contains information relating to a measurement event, the second station produces a measurement device output signal after a time delay, and
the time delay is substantially constant and chosen so that the time delay is long enough to allow retransmissions of the signal by the first station within the time delay.

15. The transmission system according to claim 10, wherein the first station has an identity code and the second station is set to only communicate with the first station having the identity code.

16. The transmission system according to claim 10, wherein the first station is provided with a mode in which the first station transmits a signal containing an identity code for the first station and the second station is provided with a mode in which, on receiving the signal containing the identity code for the first station, the second station is set to only communicate with the first station having the identity code.

17. The apparatus according to claim 1, wherein the request signal is transmitted at regular intervals in the power saving mode.

18. The transmission system according to claim 10, wherein the request signals are transmitted at regular intervals in the power saving mode.

19. The apparatus according to claim 1, wherein the first station transmits a periodic signal rather than a continuous signal when operating in the normal mode.

20. The transmission system according to claim 10, wherein the first station transmits a periodic signal rather than a continuous signal when operating in the normal mode.

21. The apparatus according to claim 1, wherein the first station periodically transmits the request signal throughout a duration of the power saving mode.

\* \* \* \* \*